(12) United States Patent
Hassett (10) Patent No.: US 7,207,626 B2
(45) Date of Patent: Apr. 24, 2007

(54) DEVICE FOR SECURING ITEMS BETWEEN TWO ADJACENT SEATS

(75) Inventor: Eric S. Hassett, Golden, CO (US)

(73) Assignee: Case Logic, Inc., Longmont, CO (US)

( * ) Notice: Subject to any disclaimer, the term of this patent is extended or adjusted under 35 U.S.C. 154(b) by 0 days.

(21) Appl. No.: 11/097,822

(22) Filed: Apr. 1, 2005

(65) Prior Publication Data

US 2005/0231009 A1  Oct. 20, 2005

Related U.S. Application Data (63) Continuation-in-part of application No. 29/214,147, filed on Sep. 27, 2004.

(60) Provisional application No. 60/559,191, filed on Apr. 1, 2004.

(51) Int. Cl.
*A47C 7/62* (2006.01)

(52) U.S. Cl. .................. 297/188.06; 297/188.2

(58) Field of Classification Search ............ 297/188.2, 297/188.05, 188.06, 188.04, 188.01, 188.18, 297/188.02, 188.07, 157.1, 188.21, 188.03; 224/275; D12/421, 416

See application file for complete search history.

(56) References Cited

U.S. PATENT DOCUMENTS

| | | | | |
|---|---|---|---|---|
| 2,566,757 A | * | 9/1951 | Alexander | .................. 297/401 |
| 2,640,595 A | | 6/1953 | Byford | |
| 4,130,316 A | * | 12/1978 | Rossi | ......................... 297/46 |
| 4,585,196 A | * | 4/1986 | Cormier | ...................... 248/214 |
| 4,801,060 A | | 1/1989 | Thompson | |
| D312,727 S | | 12/1990 | Kunewalder | |
| D313,695 S | | 1/1991 | Mawhinney et al. | |
| D318,641 S | | 7/1991 | Schwartz | |
| D318,949 S | | 8/1991 | Mawhinney et al. | |
| 5,044,321 A | * | 9/1991 | Selph | ......................... 119/416 |
| 5,044,577 A | | 9/1991 | Spearman | |
| D324,953 S | | 3/1992 | Swanner | |
| D329,836 S | | 9/1992 | Meyers | |
| 5,421,638 A | * | 6/1995 | Ayotte et al. | .......... 297/188.04 |
| 5,489,055 A | | 2/1996 | Levy | |
| D379,452 S | | 5/1997 | Russell et al. | |
| D389,115 S | | 1/1998 | Alves et al. | |
| 5,720,458 A | | 2/1998 | Carpenter | |
| 5,725,189 A | * | 3/1998 | Landy | ...................... 248/205.2 |
| 5,746,363 A | | 5/1998 | Teller et al. | |
| D396,383 S | | 7/1998 | Hanson | |
| 5,868,294 A | * | 2/1999 | Webster | ...................... 224/275 |
| D413,299 S | | 8/1999 | Hartmann et al. | |
| 6,082,816 A | * | 7/2000 | Gottlieb et al. | .......... 297/188.1 |

(Continued)

OTHER PUBLICATIONS

Case Logic Spring 2000 Catalog, p. 16.

(Continued)

*Primary Examiner*—Milton Nelson, Jr.
(74) *Attorney, Agent, or Firm*—Sheridan Ross P.C.

(57) ABSTRACT

A storage device is provided that secures a plurality of items commonly used by individuals in automobiles. More specifically, in one embodiment, the device secures a plurality of items by engaging adjacent seats of an automobile, thus allowing for easy access to the items stored therein, and which includes a deflectable loop material for securing the storage device between the vehicle seats.

8 Claims, 10 Drawing Sheets

U.S. PATENT DOCUMENTS

| | | | |
|---|---|---|---|
| 6,092,705 A * | 7/2000 | Meritt | 224/275 |
| 6,097,448 A * | 8/2000 | Perkins | 348/837 |
| D430,534 S | 9/2000 | Golenz | |
| D432,075 S | 10/2000 | Hassett et al. | |
| D441,341 S | 5/2001 | Hassett et al. | |
| 6,227,510 B1 * | 5/2001 | McMullen, Sr. | 248/311.2 |
| D451,882 S | 12/2001 | Hassett et al. | |
| 6,361,009 B1 | 3/2002 | Li | |
| D494,534 S | 8/2004 | Hassett | |
| 2004/0112931 A1 * | 6/2004 | Swaim et al. | 224/585 |

OTHER PUBLICATIONS

Case Logic 2002 Catalog, p. 33.

Axius Organizers Catalog 1998, "Auto Pockets".

* cited by examiner

DEVICE FOR SECURING ITEMS BETWEEN TWO ADJACENT SEATS

The present application claims the benefit of U.S. Provisional Patent Application Ser. No. 60/559,191, filed Apr. 1, 2004, and is a continuation-in-part of U.S. Design patent application Ser. No. 29/214,147, filed Sep. 27, 2004, which are incorporated in their entirety by reference herein.

FIELD OF THE INVENTION

The present invention relates to a device that secures and provides easy access to a plurality of items commonly used during the operation of a motor vehicle. More specifically, one embodiment of the present invention is adapted for positioning between two adjacent automobile seats to provide a plurality of storage locations for items commonly used by automobile operators such as sunglasses and cellular phones.

BACKGROUND OF THE INVENTION

Individuals spend an increasing amount of time in their automobiles, often on long commutes or delayed in traffic. In addition, some individuals choose to perform day-to-day tasks while they are in their automobiles, such as communicating on cellular phones, writing in note pads, etc. Many automobiles sold today include a plurality of storage compartments that are generally located in a center console, floor console, or overhead. However, accessing stored items such as cell phones, CDs, tapes, letters, pens, pencils, maps, etc. from compartments of the prior art is often difficult and/or distracting to the driver, and thus is a source of danger to other drivers and themselves. For example, center consoles are usually situated between two adjacent seats and require the opening of a door to gain access to the stored items. In addition, center consoles are often excessively deep, such that smaller items may be difficult to find, thus forcing the driver to search feverishly for the required items while taking their attention off the road. In addition, the glove compartments in all automobiles are on the opposite side of the driver such that accessing contents therein while driving is very difficult.

Thus, there is a long felt need in the field of automobile accessory storage to provide an efficient storage device where small items are easily accessible to the driver, and which also allow the driver to maintain his or her attention on the road while driving. The following disclosure describes a storage device for the storage of small items between two adjacent seats of an automobile, and which can be selectively inserted and removed for use in different vehicles.

SUMMARY OF THE INVENTION

It is one aspect of the present invention to provide a device that may be used in at least two distinct positions to secure items between two adjacent seats of an automobile. More specifically, one embodiment of the present invention includes a resiliently deflectable panel that provides support for the interconnection of a plurality of pockets and securement mechanisms. The resiliently deflectable panel also includes an axis thereon that allows deflection of the panel wherein it may be folded upon itself for selective engagement between two adjacent seats of an automobile. The securing mechanisms, after folding, have a combined thickness that is adapted to resiliently engage the gap found between the seats of many automobiles. Thus, the device, when folded, is adapted for positioning between the seats in a secure manner. Alternatively, the present invention may be used in an unfolded orientation if the gap between the seats is sufficiently small, thus the present invention provides more robust storage options to the consumer, and is adapted for use in a number of applications where there are different gap dimensions between the seats.

Alternatively, it is a related aspect of the present invention to provide a device that is used in only one distinct position to secure items between two adjacent seats in an automobile. More specifically, one embodiment of the present invention includes a rigid or semi-rigid panel that provides support for the interconnection of at least one of a plurality of pockets, a storage compartment, a cup holder and a securement mechanism. The panel may be comprised of cardboard, plastic fiberglass or other well known materials, covered with nylon on other similar materials. The securement mechanisms of this embodiment are similar to those described above, however, they are such that the device does not require alteration or folding to fit snugly between two seats. In addition, one embodiment includes a pocket wherein a selectively alterable cup holder is located. Further, some embodiments include storage compartments with a selectively openable panel for the storage and securement of small items and which may also include a zipper, hook and loop material or other fastening mechanisms for selective closure.

It is another aspect of the present invention to provide a device for securing items that is constructed from common materials, thus inexpensive to manufacture. One embodiment of the present invention employs a substantially rigid core with an area integrated therein that allows for selective deflection. In addition, the core is surrounded by a compliant material, such as nylon. Compliant materials are also used to construct the pockets and portions of the securing mechanisms, thus providing a device that is easily cleaned and tolerant to many environmental conditions, such as extreme heat and cold. In one embodiment of the present invention, the securing mechanisms are constructed of resiliently deflectable plastic, elastic or rubber to provide a snug fit between two adjacent seats.

It is still yet another aspect of the present invention to provide a device with a plurality of storage locations. More specifically, one embodiment of the present invention is adapted to receive and secure items commonly used or found in an automobile, such as cell phones, make-up, cigarettes, lighters, soft drinks, sunglasses, garage door openers, maps, flashlights, etc. The present invention is also adapted to secure items in an easily accessible location, such as between two adjacent seats, wherein the smaller objects may be accessed quickly and easily without having to explore the often larger storage compartments provided by automobile manufacturers. This convenient storage location increases safety by alleviating the need for the driver to take his or her attention off the road.

Thus, it is one aspect of the present invention to provide a device securing a plurality of items that is adapted to selectively engage two adjacent seats, comprising:
  a deflectable panel with an upper edge, a lower edge and lateral edges extending therebetween;
  an axis positioned between said lateral edges that divides said deflectable panel units into substantially a first segment and a second segment, wherein said deflectable panel has a first open position, which is substantially planar, and a second folded position, wherein said deflectable panel is folded about said axis;

at least one pocket interconnected to at least one of a front surface and a rear surface, said deflectable panel adapted to receive and store a plurality of items; and a first securing mechanism interconnected to at least one of said first segment and said second segment of said resiliently deflectable panel, wherein when said deflectable panel is in said second folded position a total thickness of said device is increased for operable engagement between a first seat and a second seat.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| Component | # |
| --- | --- |
| Securing device | 2 |
| Resiliently deflectable panel | 4 |
| Front surface | 6 |
| Rear surface | 8 |
| Axis | 10 |
| Pocket | 12 |
| Securing mechanism | 14 |
| Car seat | 16 |
| Writing instrument holder | 18 |
| Rear pocket | 20 |
| Sunglasses | 22 |
| Cellular phone | 24 |
| Top Edge | 26 |
| Bottom Edge | 28 |
| Lateral Edge | 30 |
| Cup Holder | 32 |
| Rigid Panel | 34 |
| Storage Compartment | 36 |
| Opening Panel | 38 |
| Gusset | 40 |
| Fastener | 42 |

DETAILED DESCRIPTION

Referring now to FIGS. 1–21, a device for securing items between two adjacent seats 2 is shown. More specifically, one embodiment of the present invention employs a resiliently deflectable panel 4 that further includes a front surface 6 and a rear surface 8, a top edge 26, a bottom edge 28, and lateral edges 30 positioned therebetween. The panel 4 of this embodiment of the present invention is capable of selective deflection about an axis 10 thereon, which in one embodiment is positioned substantially between the lateral edges 30. At least one pocket 12 is interconnected to the front surface and rear surfaces 8 of the panel 4. In addition, two securing mechanisms 14 are interconnected to the front surface 6 of the resiliently deflectable panel 4, wherein when the panel 4 is positioned in a folded position of use, the securing mechanisms are oriented on either side of the device. The securing mechanisms 14 are then adapted to selectively engage the gap commonly found between two adjacent car seats 16, for example.

Referring now to FIGS. 1–7, one embodiment of a device for securing items between two adjacent seats 2 is shown herein. As briefly mentioned above, one embodiment of the present invention includes a resilient deflectable panel 4 that is defined by an upper edge 26, a lower edge 28 and lateral edges 30 positioned therebetween, and an axis 10 that allows for folding the deflectable panel substantially in half. The front surface 6 in one embodiment of the present invention provides a location for interconnection of a plurality of pockets 12 that are adapted to receive and secure a plurality of objects, such as sunglasses, cigarettes, lighters, garage door openers, cellular phones, MP3 players, etc. In addition, the two securing mechanisms 14 are interconnected to the front surface 6. The rear surface 8 folds upon itself about the axis 10, wherein the securing mechanisms 24 are then predisposed on opposite sides of the device 2, thereby providing a lateral thickness that is adapted to selectively engage between two adjacent seats of an automobile. Preferably, in one embodiment of the present invention, the securing mechanisms 14 are arcuate shaped members that resiliently deflect to accommodate the gap between two adjacent automobile seats. As shown herein, the securing mechanisms 14 behave similar to leaf springs, and deflect sufficiently to create a biasing force between the seats, thus restricting movement. However, other securing mechanisms 14, such as Styrofoam or foam rubber blocks, or other resiliently deflectable means, may be employed without departing from the scope of this invention. Further, non-deflectable securing mechanisms 14 may be used that do not substantially deflect, but rather are rigid and function by deflecting the seat material to provide securement. In addition, depending on the space between the two adjacent seats, the present invention may be used in the undeflected first position. Further, other pockets may be integrated onto the rear surface 8 of the device 2. When used in the undeflected orientation, these rear pockets 20 may be used for thin items such as a letter, for example. Finally, other features maybe included on the present invention such as a writing instrument holder 18.

Figure 1:
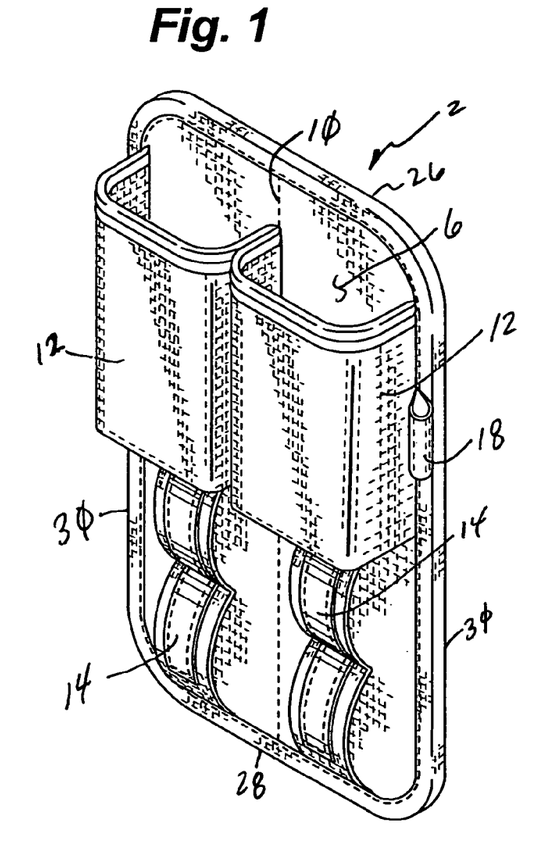
FIG. 1 is a front perspective view of one embodiment of the present invention.
Figure 2:
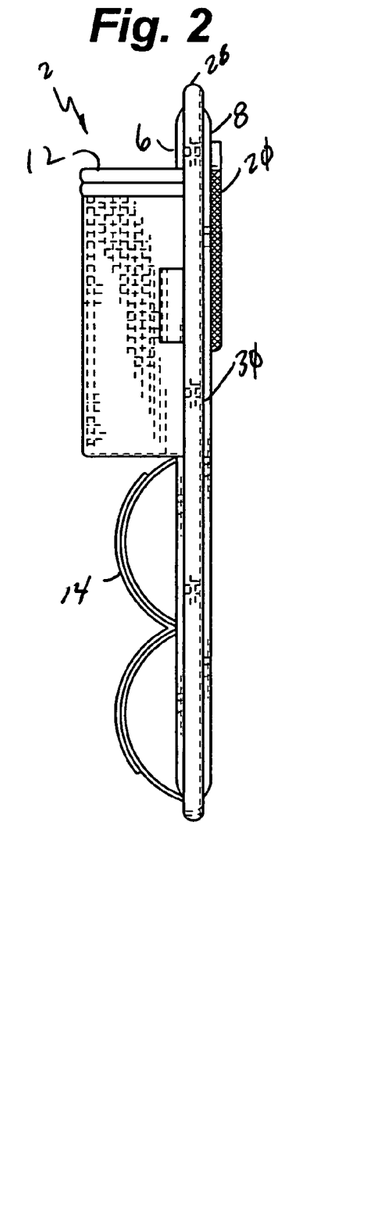
FIG. 2 is a right elevation view of the embodiment of the present invention shown in FIG. 1.
Figure 3:
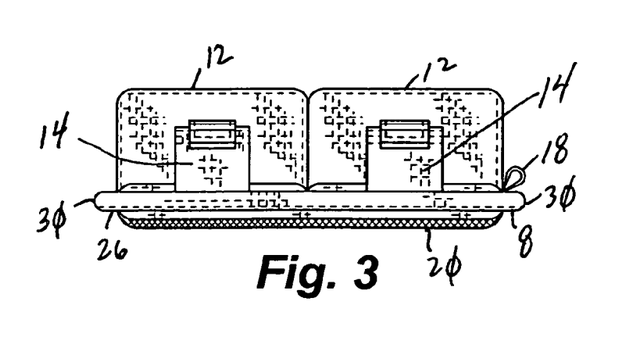
FIG. 3 is a bottom plan view of the embodiment of the present invention shown in FIG. 1.
Figure 4:
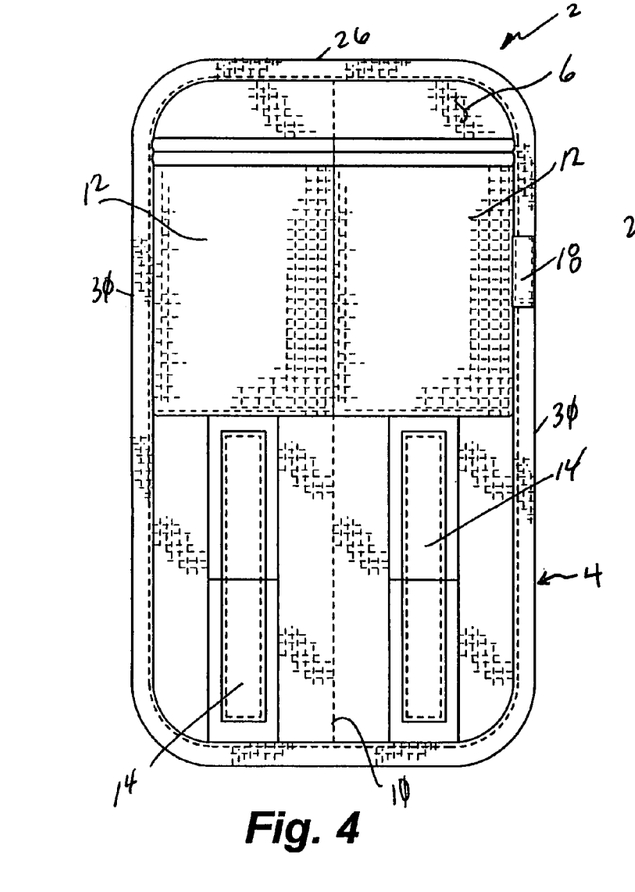
FIG. 4 is a front elevation view of the embodiment of the present invention shown in FIG. 1.
Figure 5:
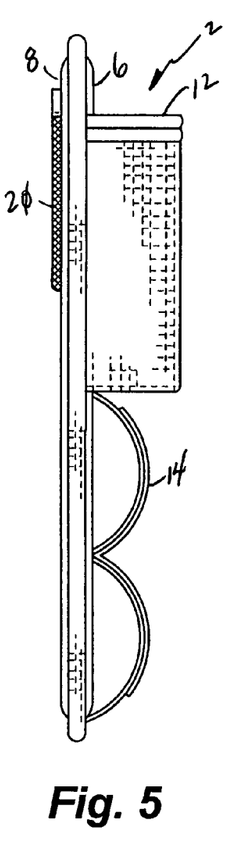
FIG. 5 is a left elevation view of the embodiment of the present invention shown in FIG. 1.
Figure 6:
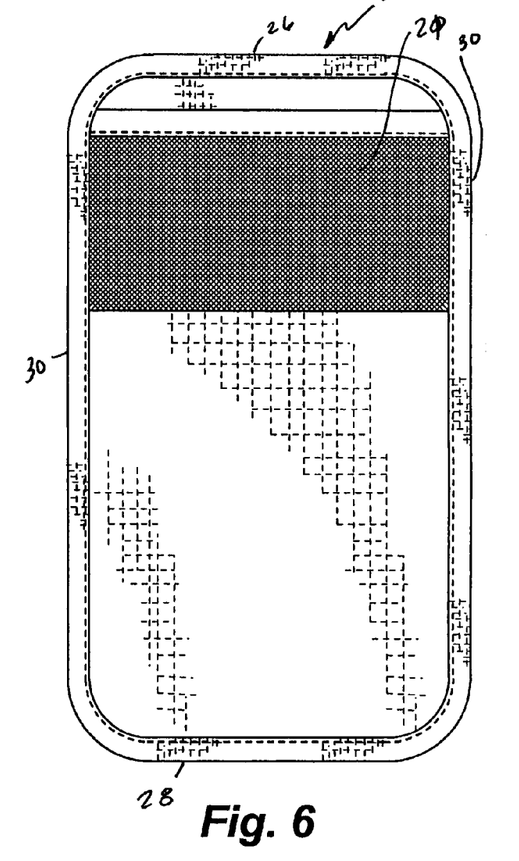
FIG. 6 is a rear elevation view of the embodiment of the present invention shown in FIG. 1.
Figure 7:
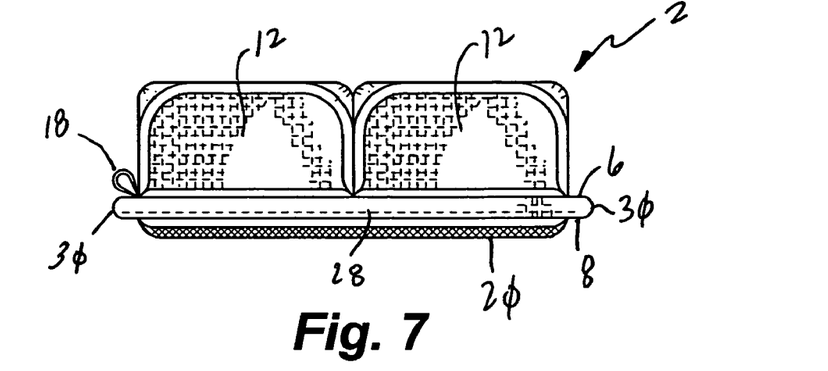
FIG. 7 is a top plan view of the embodiment of the present invention shown in FIG. 1.
Figure 8:
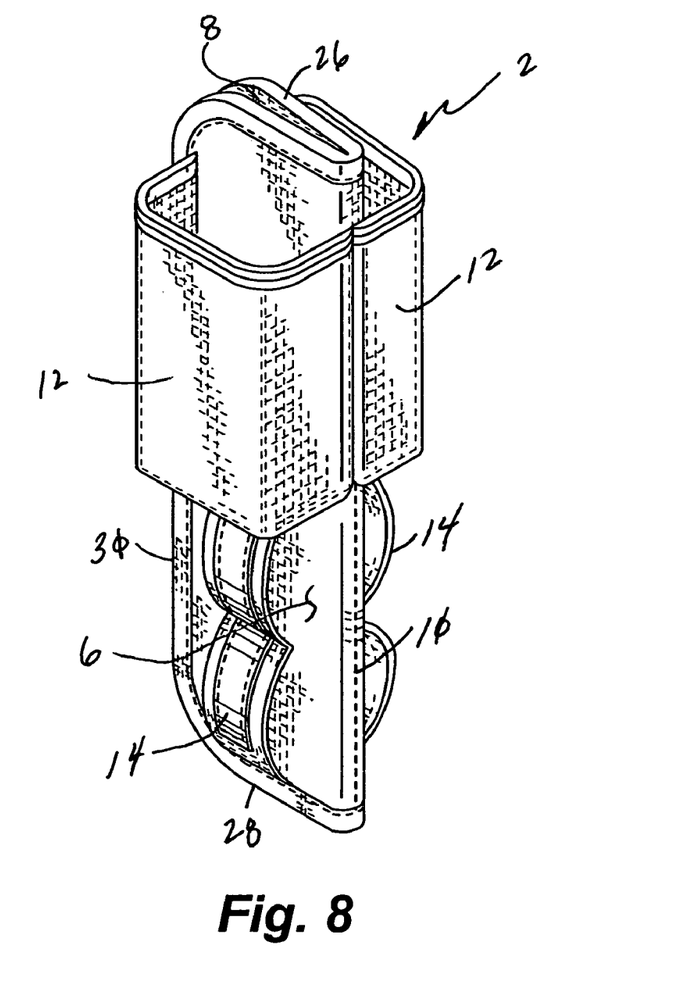
FIG. 8 is a front perspective view of the present invention shown in a second, folded position of use, wherein securing mechanisms are positioned to selectively engage two adjacent car seats.
Figure 9:
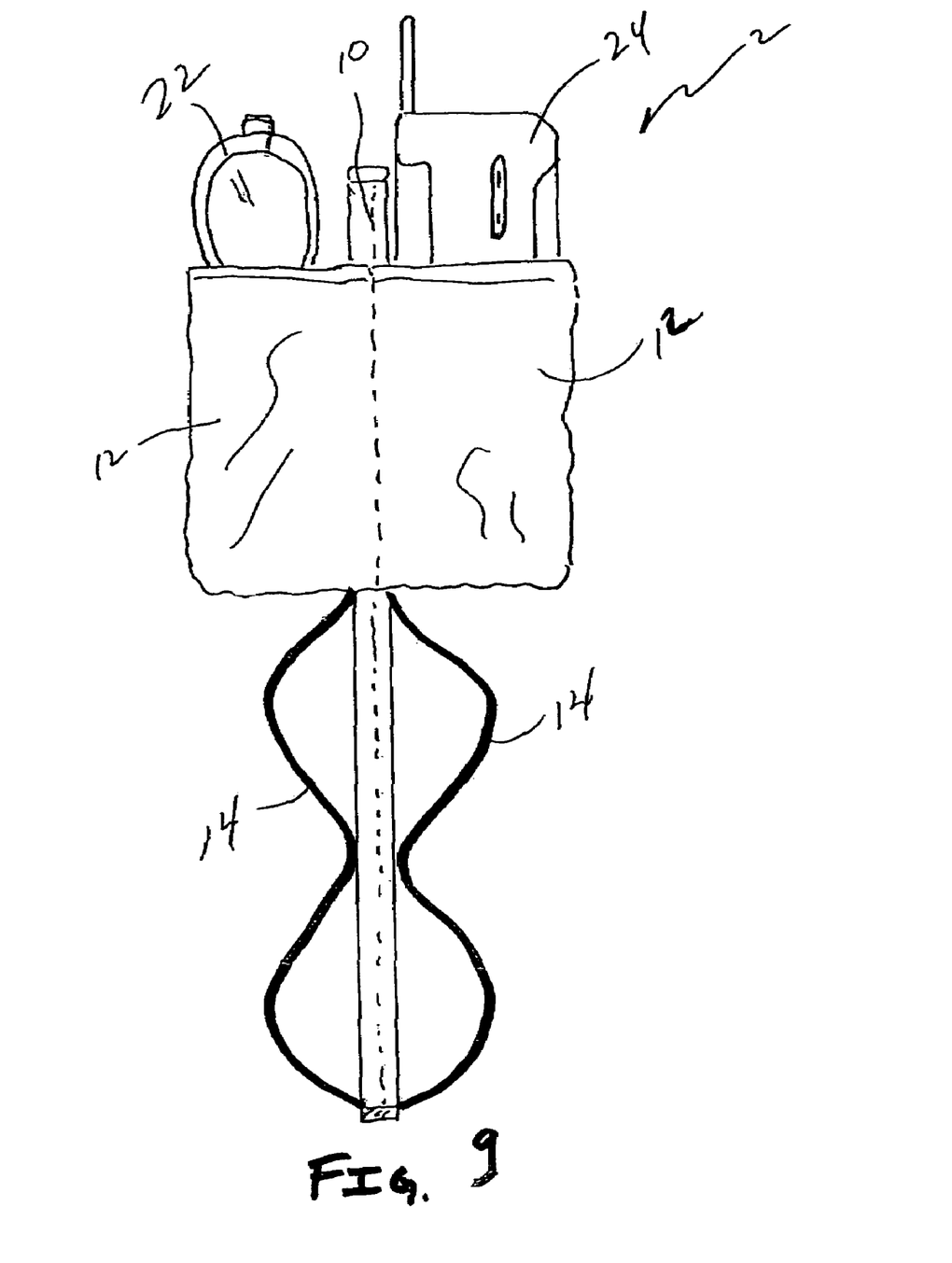
FIG. 9 is a front view of the embodiment of the present invention shown in FIG. 8 in its second position of use, wherein accessories such as sunglasses and cell phones are shown stored therein.
Figure 10:
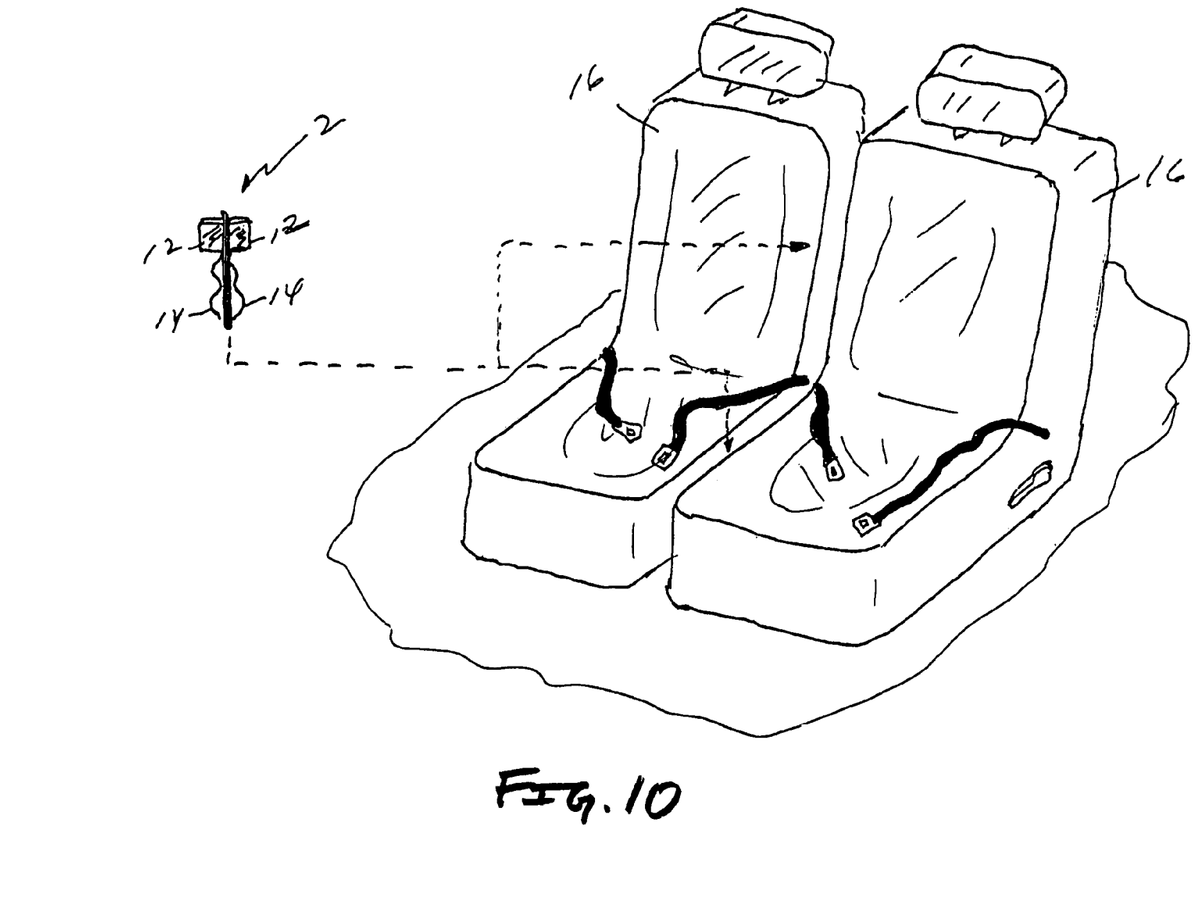
FIG. 10 is a perspective view showing securing options of the present invention between the two adjacent car seats.
Figures 11, 12:
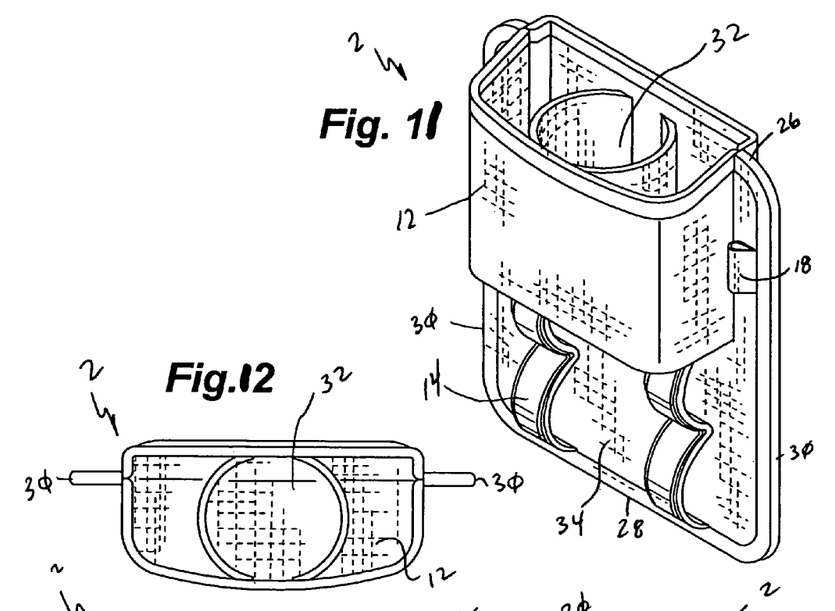
FIG. 11 is a front perspective view of another embodiment of the present invention that includes a selectively adjustable cup holder.
FIG. 12 is a top plan view of the embodiment of the present invention shown in FIG. 11.
Figure 13:
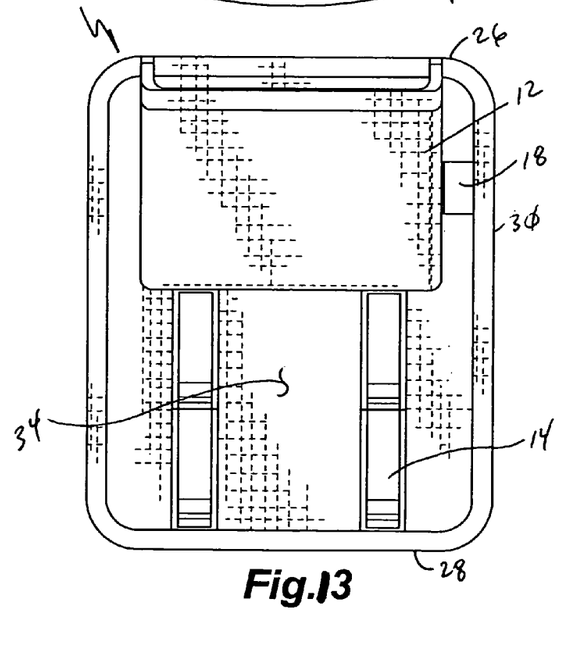
FIG. 13 is a front elevation view of the embodiment of the present inventions shown in FIG. 11.
Figure 14:
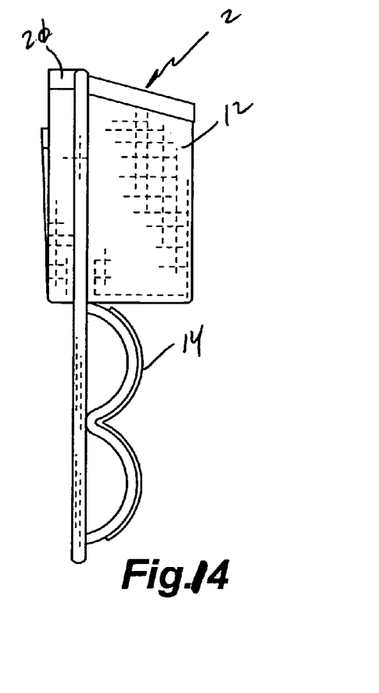
FIG. 14 is a left elevation view of the embodiment of the present invention shown in FIG. 11.
Figure 15:
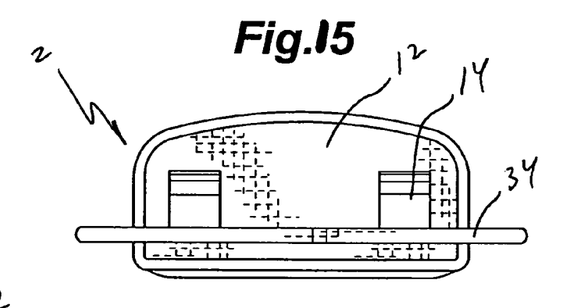
FIG. 15 is a bottom plan view of the embodiment of the present invention shown in FIG. 11.
Figure 16:
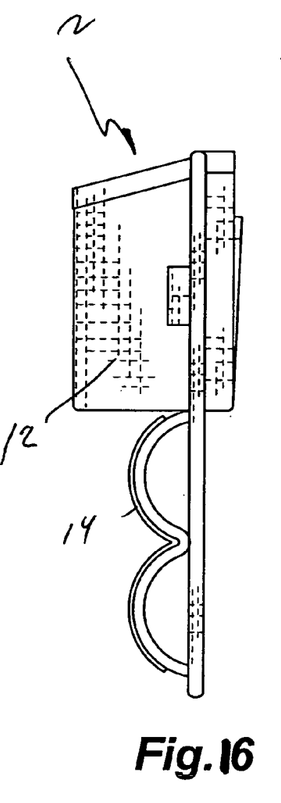
FIG. 16 is a right elevation view of the embodiment of the present invention shown in FIG. 11.
Figure 17:
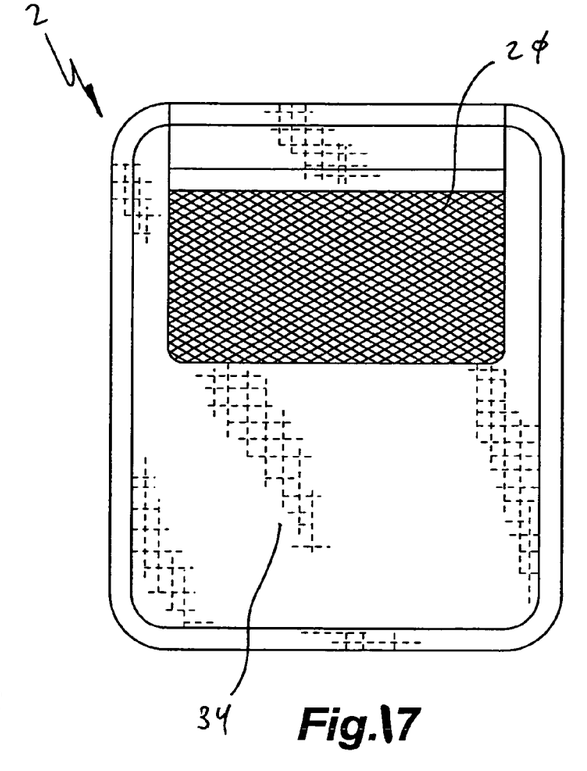
FIG. 17 is a rear elevation view of the embodiment of the present invention shown in FIG. 11.
Figure 18:
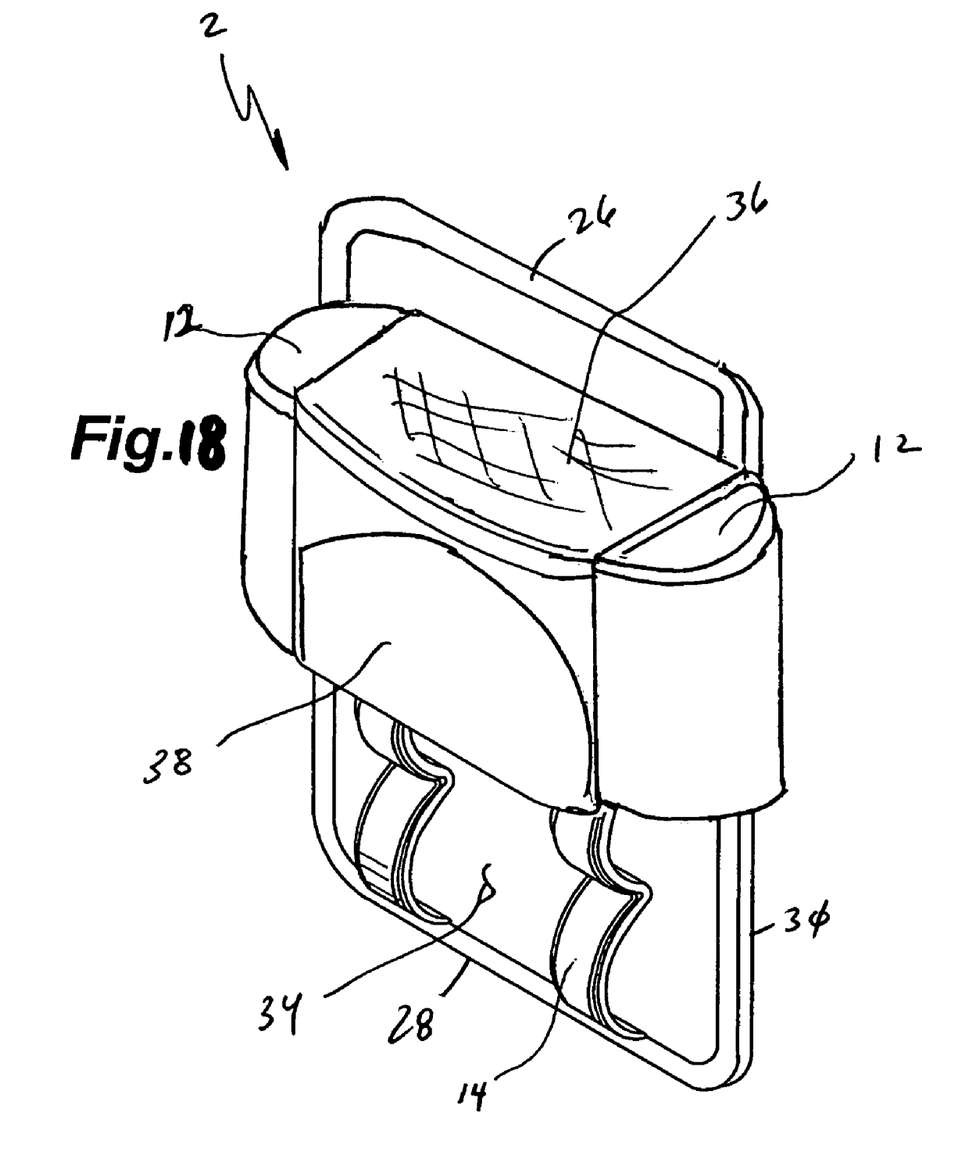
FIG. 18 is a front perspective view of another embodiment of the present invention that includes a selectively accessible storage compartment.
Figure 19:
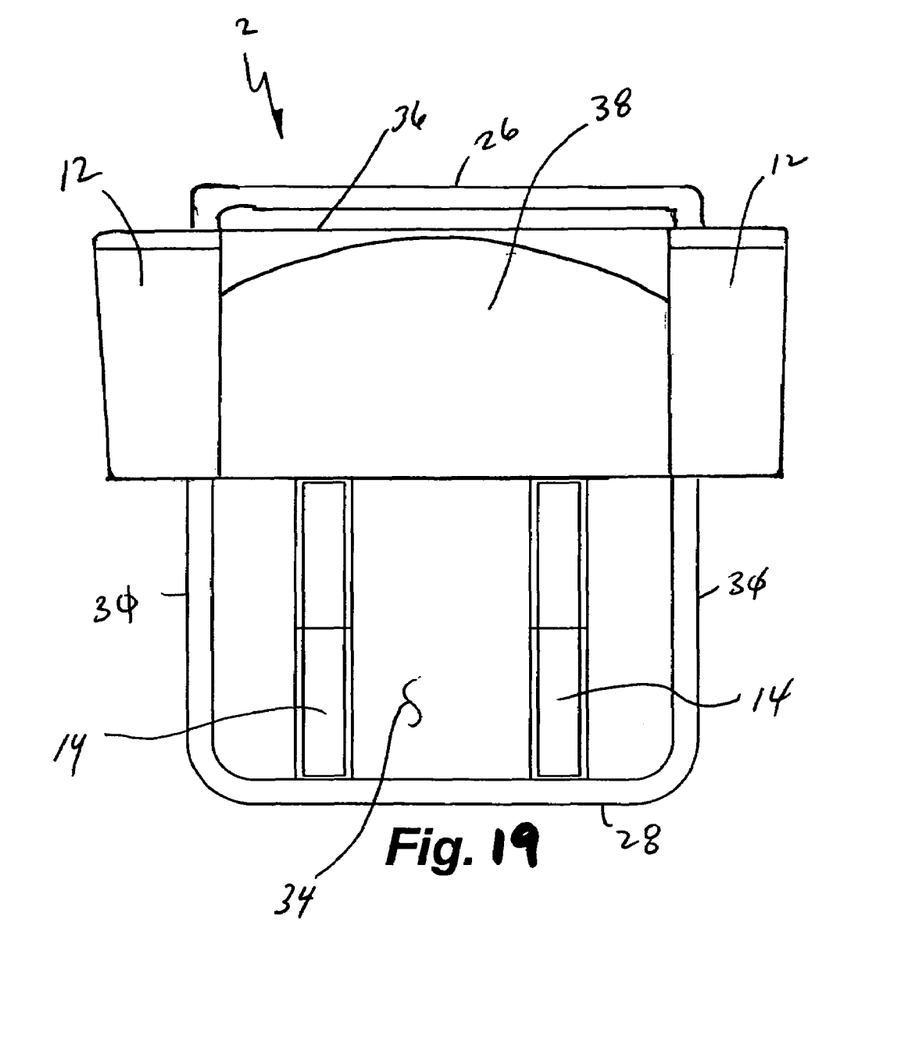
FIG. 19 is a front elevation view of the embodiment of the present inventions shown in FIG. 18.
Figure 20:
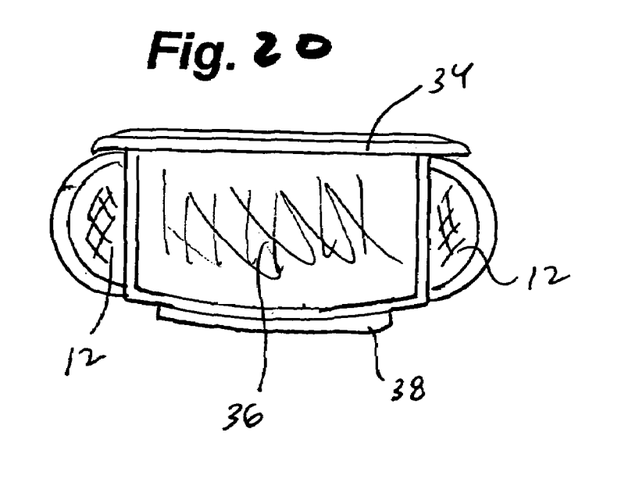
FIG. 20 is a top plan view of the embodiment of the present invention shown in FIG. 18.
Figure 21:
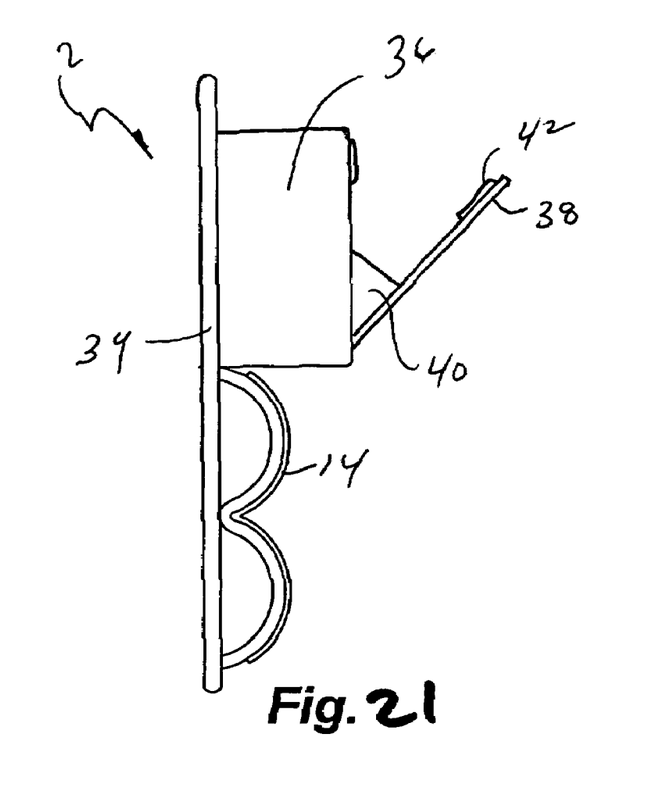
FIG. 21 is a left elevation view of the embodiment of the present invention shown in FIG. 18, and depicting the storage compartment in an open position.

Referring now to FIGS. 8–10, a device for securing items between two adjacent seats 2 is shown in the second position of use. More specifically, the resiliently deflectable panel 4 is capable of deflecting about the axis 10 employed thereon, thus creating a device 2 of sufficient width to engage and secure between two adjacent seats of an automobile 16. In one embodiment of the present invention, the securing mechanisms 14 are adapted to selectively deform between the soft seat 16 material, and thus allow the device 2 to wedge therebetween. By deflecting the securing mechanisms 14 during the insertion process, sufficient frictional force is created between the compliant surfaces of the seats 16 and the device 2 to provide structural support.

Referring now to FIGS. 11–17, a device for securing items between two adjacent seats 2 is shown that includes a selectively adjustable cup holder 32. More specifically, this embodiment is similar to that shown above, however, the panel that supports the securing mechanisms 14 and the pockets 12 is constructed of a rigid or semi-rigid material. In addition, a cup holder 32 is provided that is operably interconnected to the rigid panel 34 and selectively interconnected to an inner surface of the pocket 12. Hook and loop fasteners or similar selective interconnection mechanisms may be employed in conjunction with the cup holder 32 to allow adjustments to the diameter thereof. More specifically, the user may simply disconnect the free ends of the cup holder 32 from the pocket wall 12 and reattach the free ends to the pocket wall to provide a larger or smaller diameter containment space depending on the needs of the user. Embodiments of the invention of this type may also include a writing instrument holder 18 and a rear pocket 20 as previously described above.

Referring now to FIGS. 18–21, a device for securing items between two adjacent seats 2 is shown that includes a selectively accessible storage compartment 36. This embodiment of the present invention also includes a rigid panel 34 and securing mechanisms 14 as described above. In addition, the storage compartment 36 is provided that includes a panel that may be selectively opened to provide access into the storage compartment. Here, the selectively opening panel 38 is shown interconnected to a front surface of the storage compartment 36. However, one skilled in the art will appreciate that the opening panel 38 may be interconnected to any surface of the storage compartment, such as the upper surface of the storage compartment 36 or on side compartments or adjacent to the sides thereof. The opening panel 38 may also include a gusset 40 that provides strength and prevents wear and tear associated with continuous openings. Further, the opening panel 38 may include a fastener, such as hook and loop fasteners, to ensure the storage compartment remains closed when not in use.

This embodiment of the present invention may also include a plurality of pockets 12 situated on the sides of the storage compartment. One skilled in the art will appreciate that these pockets may be adapted to be selectively openable to gain access to the storage compartment as well.

Referring now to FIGS. 1–21, a method of constructing one embodiment of the present invention is shown and described herein. One embodiment of the present invention is constructed of resiliently deflectable material that is enveloped by a compliant material, such as nylon, which resists spills and stains and is easily cleaned. The pockets 12 of this embodiment of the present invention are also constructed from a similar material and interconnected onto the resiliently deflectable panel 4. The axis 10 of the resiliently deflectable panel may be constructed by reducing the thickness of the panel core to allow for easier deflection thereof. The pockets may be constructed of a mesh material to allow for viewing of the contents therein. Preferably, in one embodiment of the present invention, the securing mechanisms 14 are constructed of a semi-rigid plastic material that is adapted to selectively deflect to allow for insertion and securement of the device 2 between two adjacent seats 16.

Referring now to FIGS. 1–21, a method of using the present invention is shown and described herein. To secure the device 2 between two adjacent seats 16 the resiliently deflectable panel 14 is simply deflected and folded upon itself to thus orient the securing mechanisms 14 on either side of the device 2. The securing mechanisms 14 are then inserted between two adjacent seats 16 by slightly deflecting the seats 16. Once the device 2 is in place, the compliant nature of the seats 16 will force them onto the securing mechanisms 14 resulting in structural stability. This balance of forces will secure the device 2 between the two seats 16 wherein it will remain in position during normal vehicle use. Finally, a plurality of items such as sunglasses 22, cell phones 24, make up, etc. are inserted into the pockets 12. It should be noted that the pockets 12 may be constructed of a resiliently deflectable material to more securely hold the items contained therein. For example, the pockets 12 may be partially constructed of an elastic material that will squeeze the contained items.

While various embodiment of the present invention have been described in detail, it is apparent that modifications and adaptations of those embodiments will occur to those skilled in the art. However, it is to be expressly understood that such modifications and adaptations are within the scope and spirit of the present invention, as set forth in the following claims.

What is claimed is:

1. A storage device adapted for selective engagement between a seating surface of two adjacent seats, comprising:
    a panel with an upper edge, a lower edge and lateral edges extending therebetween;
    an axis positioned between said lateral edges that divides said panel into substantially a first segment and a second segment, wherein said panel has a first open position, which is substantially planar, and a second folded position, wherein said panel is folded about said axis;
    at least one pocket interconnected to at least one of a front surface and a rear surface, said at least one pocket adapted to receive and store a plurality of items; and
    a first securing mechanism having a first end separated from a second end, each of said first end and said second end interconnected to at least one of said first segment and said second segment of said panel, wherein when said panel is in said second folded position a total thickness of said storage device is increased so that it is adapted for operable engagement between the two adjacent seats wherein a compressive force is exerted on each of the two adjacent seats to impede removal of said storage device.

2. The storage device of claim 1, wherein said storage device is adapted to fit between two adjacent seats in either of said first open position and said second folded position depending on a spacing between the two adjacent seats.

3. The device of claim 1, wherein said first securing mechanism is resiliently biased, and will deflect when a compressive force is applied thereto.

4. The storage device of claim 3, wherein said first securing mechanism is at least partially comprised of a metal or a plastic material.

5. The device of claim 1, further comprising a second securing mechanism having a first end separated from a second end, each interconnected to at least one of said first segment and said second segment, and which is positioned substantially opposite to said first securing mechanism when said device is in said second folded position.

6. The storage device of claim 5, wherein when said panel is in said second folded position, a total thickness of said panel measured at said first securing mechanism is about two times as when said panel is in said first open position.

7. The storage device of claim 5, wherein said first securing mechanism and said second securing mechanism are substantially non-deflectable.

8. The storage device of claim 5, wherein said first securing mechanism and said second securing mechanism are comprised of at least one of a rubber, a styrofoam, a nylon, and a plastic material.

* * * * *